(12) United States Patent
Sakai

(10) Patent No.: US 7,585,488 B2
(45) Date of Patent: Sep. 8, 2009

(54) ANATASE-TYPE TITANIUM OXIDE POWDER AND METHOD FOR PRODUCING SAME

(75) Inventor: Hideki Sakai, Chigasaki (JP)

(73) Assignee: Toho Titanium Co., Ltd., Chigasaki-shi (JP)

( * ) Notice: Subject to any disclaimer, the term of this patent is extended or adjusted under 35 U.S.C. 154(b) by 192 days.

(21) Appl. No.: 10/593,712

(22) PCT Filed: Mar. 10, 2005

(86) PCT No.: PCT/JP2005/004724

§ 371 (c)(1),
(2), (4) Date: Sep. 21, 2006

(87) PCT Pub. No.: WO2005/092797

PCT Pub. Date: Oct. 6, 2005

(65) Prior Publication Data

US 2007/0189958 A1 Aug. 16, 2007

(30) Foreign Application Priority Data

Mar. 26, 2004 (JP) .............................. 2004-092026

(51) Int. Cl.
*C01G 23/047* (2006.01)
*C01G 23/07* (2006.01)
(52) U.S. Cl. ......................... 423/613; 423/69; 423/75; 423/76; 423/610; 423/611; 423/612

(58) Field of Classification Search .................. 423/69, 423/75, 76, 610, 611, 612, 613; 502/350
See application file for complete search history.

(56) References Cited

U.S. PATENT DOCUMENTS

| 2,488,440 | A | * | 11/1949 | Schaumann | .................. | 423/613 |
| 6,281,277 | B1 | * | 8/2001 | Ishii et al. | .................... | 524/444 |
| 2005/0076811 | A1 | * | 4/2005 | Kayama et al. | ............. | 106/437 |

FOREIGN PATENT DOCUMENTS

| JP | 3 252315 | 11/1991 |
| JP | 08 333117 | 12/1996 |
| JP | 2001 151510 | 6/2001 |
| JP | 2001 287997 | 10/2001 |
| JP | 2003 327432 | 11/2003 |

* cited by examiner

*Primary Examiner*—Timothy C Vanoy
*Assistant Examiner*—Serena L Hanor
(74) *Attorney, Agent, or Firm*—Oblon, Spivak, McClelland, Maier & Neustadt, P.C.

(57) ABSTRACT

An anatase-type titanium oxide powder having a ratio of rutile to anatase of 10% or less and a BET specific surface area of 20 to 80 $m^2/g$. Since the titanium oxide powder has a large specific surface area and a low ratio of rutile to anatase in comparison with a conventional titanium oxide powder and excels in dispersibility, the titanium oxide powder is suitable for various applications.

10 Claims, 1 Drawing Sheet

ANATASE-TYPE TITANIUM OXIDE POWDER AND METHOD FOR PRODUCING SAME

TECHNICAL FIELD

The present invention relates to anatase-type titanium oxide powder with a small specific surface area and a low ratio of rutile to anatase, and particularly to titanium oxide which can be used for a photocatalyst, an optical material, and the like.

BACKGROUND ART

Titanium oxide powder has been used as a white pigment for many years. More recently, titanium oxide powder is widely used as a UV shielding material for cosmetics and the like, a material for forming a photocatalyst, a capacitor, or a thermistor, and a sintered material used for electronic materials such as a raw material of barium titanate. Due to possession of a large refractive index in a wavelength region near visible light, the titanium oxide absorbs almost no light in the visible-light region. For these reasons, titanium oxide powder is recently used as a material that requires UV shielding properties such as a cosmetic composition, drug, or coating material and as an antireflection film for a display part of a liquid crystal display and a plastic lens. The antireflection film typically comprises a layer formed by alternately laminating a layer of a resin with a low refractive index, such as a fluororesin or silicon-containing resin, and a high refractive index layer. Titanium oxide is used as a material for the high refractive index layer of the antireflection film. In addition, in plasma displays for which demand is recently increasing, a glass material used for substrate partitions is covered with titanium oxide in order to promote brightness and improve reflectance or is caused to contain rutile-type titanium oxide powder in order to improve the refractive index.

The rutile-type titanium oxide is more excellent than anatase-type titanium oxide in optical characteristics, such as UV shielding characteristics and high refractive index, and electrical properties such as high dielectric properties.

Titanium oxide is excited when irradiated with light having energy not less than its band gap and produces electrons in the conduction band and positive holes in the valence band. Development for application of a photocatalyst utilizing a reduction power of the electrons and an oxidation power of positive holes is actively undertaken. There are various applications of the titanium oxide photocatalyst. A number of application developments such as hydrogen production by decomposition of water, exhaust gas treatment, air cleaning, deodorization, sterilization, antibacterial treatment, waste water treatment, stain-proofing of illumination equipment, and the like are ongoing.

The anatase-type titanium oxide is used as a photocatalyst material due to the high catalytic activity.

As a method for obtaining anatase-type titanium oxide, Japanese Patent Application Laid-open No. 8-333117 discloses a method for producing anatase-type titanium oxide particles having a uniform particle size and a large specific surface area. The method comprises preparing an aqueous solution of titanyl sulfate containing titanyl sulfate in an amount of 5.0-100 g/l (as $TiO_2$) and an excess amount of sulfuric acid of 1.0-3.0 times of Ti (as mol), adding urea in an amount equimolar or more to the total sulfate group, heating the mixture at a temperature from 85° C. to boiling point to collect deposited meta-titanic acid particles, and baking the meta-titanic acid particles at 650-850° C.

Japanese Patent Application Laid-open No. 2001-287997 discloses a method of oxidizing titanium tetrachloride in a gas phase oxidation reaction by causing 1 l titanium tetrachloride gas to come in contact with 1-30 l of oxygen (gas volume being indicated in a standard state gas volume) at 700-850° C. and to produce titanium oxide particles and heat-treating the resulting titanium oxide particles at 300-850° C.

(Patent Document 1) Japanese Patent Application Laid-open No. 8-333117

(Patent Document 2) Japanese Patent Application Laid-open No. 2001-287997

The titanium oxide particles obtained by the method disclosed by Patent Document 1 have a large specific surface area and exhibit only poor dispersibility when used as a photocatalyst. In addition, handling of the titanium oxide particles is very difficult. The titanium oxide powder disclosed by Patent Document 2 has a high ratio of rutile to anatase of 20%.

These titanium oxide powders are mixtures of rutile-type titanium oxide and anatase-type titanium oxide. Even though their specific surface area is small and dispersibility is excellent, their ratio of rutile to anatase is comparatively high. Titanium oxide with a smaller ratio of rutile to anatase has a large specific surface area and exhibits only poor dispersibility. Therefore, titanium oxide powder exhibiting higher photocatalyst activity and excellent dispersibility has been demanded.

An object of the present invention is therefore to provide titanium oxide powder having a specific surface area larger than the specific surface area of the titanium oxide powder described in Patent Document 2 and having a ratio of rutile to anatase smaller than the ratio of rutile to anatase of the titanium oxide powder described in Patent Document 2, and a method for producing the titanium oxide powder.

DISCLOSURE OF THE INVENTION

As a result of extensive studies to achieve the above object, the inventor of the present invention has found an anatase-type titanium oxide powder having a larger specific surface area and a smaller ratio of rutile to anatase than those of the titanium oxide powder described in Patent Document 2. This finding has led to the completion of the present invention.

Specifically, the titanium oxide powder of the present invention has a ratio of rutile to anatase of 10% or less and a BET specific surface area of 20 to 80 $m^2/g$.

In addition, the inventor has discovered a method for producing the anatase-type titanium oxide powder having a ratio of rutile to anatase of 10% or less and a BET specific surface area of 20 to 80 $m^2/g$ by gas phase oxidation or gas phase hydrolysis of titanium tetrachloride, leading to completion of the present invention.

Specifically, the present invention provides a method for producing an anatase-type titanium oxide powder with a small specific surface area comprising reacting titanium tetrachloride gas, oxygen gas, hydrogen gas, and steam in a gas phase, characterized by previously heating each raw material gas of the titanium tetrachloride gas, oxygen gas, hydrogen gas, and steam at 450 to 650° C., and feeding the raw material gases at a rate of 60 to 90 l of oxygen gas, 60 to 90 l of hydrogen gas, and 240 to 600 l of steam for 1 l of titanium tetrachloride gas.

The titanium oxide powder of the present invention has a small BET specific surface area in spite of a small ratio of rutile to anatase and is useful as a photocatalyst. The method for producing titanium oxide powder of the present invention can produce an anatase-type titanium oxide powder having a small BET specific surface area in spite of a small ratio of rutile to anatase.

BEST MODE FOR CARRYING OUT THE INVENTION

Figure 1:
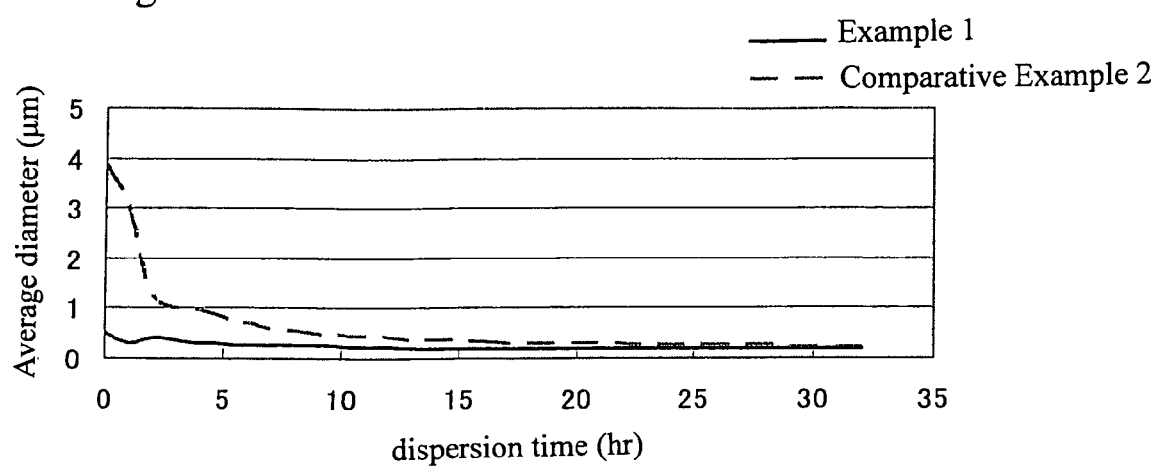
FIG. 1 is a chart showing results of dispersibility evaluation by a dynamic light scattering method.

The ratio of rutile to anatase of the titanium oxide powder of the present invention is 10% or less, preferably 8% or less, and still more preferably 5% or less. The low ratio of rutile to anatase in this range ensures a high photocatalyst activity.

The ratio of rutile to anatase is measured by X-ray diffraction according to the method of ASTM D3720-84, in which the peak area (Ir) of the strongest diffraction line (index of plane 110) of rutile-type crystal titanium oxide and the peak area (Ia) of the strongest diffraction line (index of plane 101) of anatase-type crystal titanium oxide are measured and applied to the following formula.

Ratio of rutile to anatase (wt %)=100−100/(1+1.2 ×$Ir/Ia$)

Ir and Ia refer to the areas projecting from the baseline in the applicable diffraction line of the X-ray diffraction pattern. These areas are determined by a known method such as computer calculation, an approximation triangle-formation method, or the like.

The BET specific surface area of the titanium oxide powder of the present invention is from 20 to 80 $m^2/g$, preferably from 20 to 60 $m^2/g$, and still more preferably from 20 to 40 $m^2/g$. The average particle diameter is from 10 to 100 nm, preferably from 15 to 80 nm, and still more preferably from 20 to 75 nm.

Because the anatase-type titanium oxide powder of the present invention is obtained by a gas phase method of oxidizing titanium tetrachloride by a gas phase oxidation reaction, the titanium oxide powder has no problem of residual or mingled impurities as in the case of titanium oxide powder obtained by a liquid phase method. In particular, the content of Fe, Al, Si, and Na is respectively less than 100 ppm and the content of Cl is 700 ppm or less, and the content of S is less than 10 ppm, preferably less than 7 ppm, and particularly preferably less than 5 ppm.

As the method for producing anatase-type titanium oxide of the present invention, a gas phase reaction method of oxidizing titanium tetrachloride by causing the titanium tetrachloride to come into contact with oxygen in a gas phase, a flame hydrolyzing method comprising supplying an inflammable gas such as hydrogen gas, which generates water when burned, together with oxygen to a combustion burner, thereby forming a flame, and introducing titanium tetrachloride into the flame, and the like can be given.

The method for producing titanium oxide powder of the present invention will now be described in detail.

The method for producing titanium oxide of the present invention is a method of hydrolyzing or oxidizing titanium tetrachloride in a gas phase and specifically comprises causing titanium tetrachloride vapor to come in contact with hydrogen gas, oxygen gas, and steam in a gaseous state. The amount of oxygen gas and hydrogen gas to be supplied is 60 to 90 l, preferably 70 to 90 l, and more preferably 80 to 90 l for 1 l of titanium tetrachloride gas supplied to a reaction section. The amount of steam to be supplied is 240 to 600 l for 1 l of titanium tetrachloride gas supplied to the reaction section. If the amount of steam is too large, hydrolysis of titanium tetrachloride is promoted, resulting in production of fine titanium oxide particles with an increased specific surface area. If the amount of steam is too small, a sufficient reaction will not occur, resulting in a titanium oxide with unreacted titanium tetrachloride mixed therein. In order to produce titanium oxide with a specific surface area of 20 to 40 $m^2/g$, the amount of steam supplied is preferably 240 to 400 l. The amount of each raw material gas supplied varies according to the scale of reaction, the diameters of the nozzles used for supplying each gas, and the like and, therefore, a specific amount of each raw material gas is appropriately determined. The feed rate of each gas in the reaction section, particularly the feed rate of titanium tetrachloride gas, is preferably set so that a turbulent flow region may be formed in a combustion flame of the reaction section. In addition, each component gas may be supplied to and reacted in the reaction section after being diluted with an inert gas such as argon or nitrogen.

The titanium tetrachloride gas, oxygen gas, hydrogen gas, and steam are supplied to the reaction section after preheating at 450 to 650° C., and preferably to 500 to 600° C. If the preheating temperature is too high, the ratio of rutile to anatase will increase; if less than 450° C., the reaction does not sufficiently proceed.

After producing titanium oxide powder by the reaction of the gases in the above manner, the reaction system is cooled to a temperature not higher than the temperature at which titanium oxide particles are sintered, specifically to a temperature of about 200° C. in order to prevent aggregation of produced particles.

After removing chlorine components such as hydrogen chloride by heat treatment or the like, the titanium oxide powder obtained in this manner is classified or sieved, as required, thereby obtaining anatase-type titanium oxide powder of the present invention.

A specific process for producing anatase-type titanium oxide powder of the present invention will now be described. First, liquid titanium tetrachloride is vaporized by preheating at 450 to 650° C. and, as required, diluted with nitrogen gas before being introduced to the reactor. Simultaneously with the introduction of titanium tetrachloride, oxygen gas, hydrogen gas, and steam preheated at 450 to 650° C., after dilution with nitrogen gas, as required, are introduced to the reactor, wherein the oxidation reaction is carried out. The oxidation reaction must be carried out at a temperature not lower than the temperature at which titanium oxide is produced and not higher than the temperature at which the crystal structure of the titanium oxide is converted into a rutile type, usually in a range from 500 to 700° C., and preferably from 550 to 650° C. Oxidation at a comparatively low temperature is preferred for obtaining the anatase-type titanium oxide powder of the present invention.

The produced anatase-type titanium oxide particles are introduced into a cooling section to cause the titanium oxide powder to come into contact with a coolant gas such as air, thereby cooling the titanium oxide powder to about 200° C. After that, the produced titanium oxide powder is collected to remove chlorine components remaining in the titanium oxide powder by means of a heat treatment such as heating under vacuum, heating in an air or nitrogen gas atmosphere, or steam processing or by contact with alcohol, thereby obtaining the anatase-type titanium oxide powder of the present invention. To remove chlorine components remaining in the titanium oxide powder by a heat treatment in the air, the titanium oxide powder is heated at 300 to 400° C. for 10 to 20 hours.

The anatase-type titanium oxide powder of the present invention is useful as a photocatalyst, an optical material, and the like, particularly as a photocatalyst.

The present invention will be described in more detail by examples, which should not be construed as limiting the present invention.

EXAMPLE 1

Anatase-type titanium oxide powder was produced by the gas phase reaction method of oxidizing titanium tetrachloride by causing it to come into contact with oxygen in a gas phase. Using a gas phase reaction pipe equipped with a multiplex pipe burner, with an inner diameter of 12 mm and outer diameter of 20 mm, on the top, titanium tetrachloride gas preheated at about 500° C. was supplied to the multiplex pipe burner, while supplying hydrogen gas, oxygen gas, and steam preheated at 500° C. from another nozzle, thereby effecting the oxidation reaction in the gas phase reaction pipe at about 600° C. to produce titanium oxide powder. The feed rate of titanium tetrachloride, oxygen gas, hydrogen gas, and steam under the standard state was respectively 500 ml/min, 40 l/min, 40 l/min, and 130 l/min. After that, air at room temperature was supplied to the cooling section in the lower part of the gas phase reaction pipe at a rate of 400 l/min to cool the produced titanium oxide powder. The resulting titanium oxide powder was treated with heat at 380° C. in the atmosphere for 18 hours. The average particle diameter, ratio of rutile to anatase, specific surface area, content of impurities, and particle size distribution of the resulting titanium oxide powder were measured. The results are shown in Table 1. The average particle diameter, ratio of rutile to anatase, specific surface area, content of impurities, and particle size distribution of the titanium oxide powder were measured according to the following methods.

(Average Particle Diameter)

The titanium oxide powder was inspected using a scanning electron microscope to measure the average particle diameter by the intercept method. (Number of analyzed particles: 200)

(Ratio of Rutile to Anatase)

The ratio of rutile to anatase was determined by measuring the X-ray diffraction pattern according to the method of ASTM D 3720-84, in which the peak area (Ir) of the strongest interference line (index of plane 110) of rutile-type crystal titanium oxide and the peak area (Ia) of the strongest interference line (index of plane 101) of the anatase-type crystal titanium oxide were measured and applying the results to the above-described formula. The X-ray diffraction measurement conditions were as follows.

(X-ray diffraction measurement conditions)
Instrument: RAD-1C (manufactured by Rigaku Corp.)
X-ray tube ball: Cu
Tube voltage and tube current: 40 kV, 30 mA
Slit: DS-SS: 1°, RS: 0.15 mm
Monochrometer: graphite
Measurement interval: 0.002°
Counting method: Scheduled counting method (Specific Surface Area)

Measured by the BET method.

(Impurity Content)

Sulfur components in the titanium oxide were measured by the combustion infrared absorption method. Fe, Al, Si, and Na in titanium oxide were measured by plasma emission spectral analysis. Cl in titanium oxide was measured by titration used silver nitrate.

(Particle Size Distribution)

Using a laser scattering diffraction particle size analyzer (LA-700: Horiba, Ltd.), an appropriate amount of titanium oxide powder was suspended in purified water, followed by dispersing the particles by application of ultrasonic wave for three minutes. The particle size was measured and the particle size distribution (volume statistic value) was determined. The particle size distribution (SPAN) was determined from D90 (90% particle size (μm) in cumulative particle size), D50 (50% particle size (μm) in cumulative particle size), and D10 (10% particle size (μm) in cumulative particle size) according to the following formula.

$SPAN=(D90-D10)/50$

EXAMPLE 2

Titanium oxide powder was prepared in the same manner as in Example 1 except for supplying steam at a rate of 200 l/min. The average particle diameter, ratio of rutile to anatase, specific surface area, content of impurities, and particle size distribution of the resulting titanium oxide powder are shown in Table 1.

EXAMPLE 3

Titanium oxide powder was prepared in the same manner as in Example 1 except for supplying steam at a rate of 300 l/min. The average particle diameter, ratio of rutile to anatase, specific surface area, content of impurities, and particle size distribution of the resulting titanium oxide powder are shown in Table 1.

COMPARATIVE EXAMPLE 1

Titanium oxide powder was prepared in the same manner as in Example 1 except for supplying oxygen gas and hydrogen gas at a rate of 95 l/min and supplying steam at a rate of 350 l/min. The average particle diameter, ratio of rutile to anatase, specific surface area, content of impurities, and particle size distribution of the resulting titanium oxide powder are shown in Table 1.

COMPARATIVE EXAMPLE 2

Titanium oxide powder was prepared in the same manner as in Example 1 except for preheating titanium tetrachloride gas, hydrogen gas, oxygen gas, and steam at 800° C. The particle diameter, ratio of rutile to anatase, specific surface area, content of impurities, and particle size distribution of the resulting titanium oxide powder were measured. The results are shown in Table 1.

COMPARATIVE EXAMPLE 3

An experiment for producing titanium oxide powder was carried out in the same manner as in Example 1 except for preheating titanium tetrachloride, hydrogen gas, oxygen gas, and steam at 400° C. and supplying hydrogen gas and oxygen gas at a rate of 20 l/min and supplying steam at a rate of 110 l/min. However, the reaction did not proceed and titanium oxide powder was not produced.

TABLE 1

|  | Example | | | Comparative Example | |
|---|---|---|---|---|---|
|  | 1 | 2 | 3 | 1 | 2 |
| Average particle diameter (nm) | 70 | 50 | 40 | 12 | 50 |
| Ratio of rutile to anatase (%) | 4.6 | 2.2 | 4.2 | 8.6 | 92.2 |
| Specific surface area ($m^2/g$) | 26.0 | 33.3 | 42.4 | 86.2 | 30.5 |
| Impurities content (ppm) | | | | | |
| S | <10 | <10 | <10 | <10 | <10 |
| Fe | 10 | 10 | 10 | 10 | 10 |
| Al | <10 | <10 | <10 | <10 | <10 |
| Si | <10 | <10 | <10 | <10 | <10 |
| Na | <10 | <10 | <10 | <10 | <10 |
| Cl | 500 | 570 | 690 | 820 | 540 |
| Particle size distribution | | | | | |
| D90 | 1.80 | 1.18 | 2.08 | 2.65 | 1.85 |
| D50 | 0.60 | 0.44 | 0.41 | 0.40 | 0.54 |
| D10 | 0.18 | 0.15 | 0.14 | 0.10 | 0.20 |
| SPAN | 2.7 | 4.9 | 4.7 | 6.4 | 3.1 |

As is clearly shown in Table 1, the titanium oxide powders obtained in the experiments of the Examples, in which titanium tetrachloride gas, oxygen gas, hydrogen gas, and steam were preheated at 450 to 650° C., oxygen gas and hydrogen gas were supplied at a rate of 60 to 90 l/min, and steam was supplied at a rate of 240 to 600 l/min for the amount of titanium tetrachloride gas of 1 l/min, had a low ratio of rutile to anatase of 10% or less and a small specific surface area as compared with the titanium oxide powder obtained in Comparative Example 1. In addition, the titanium oxide powders of the Examples had a large average particle diameter and narrow particle size distribution. These titanium oxide powders exhibited excellent dispersibility in solvents. The titanium oxide powder of Comparative Example 1 had a large specific surface area due to a large supply amount of steam. In addition, due to an excess supply amount of oxygen gas and hydrogen gas, the titanium oxide powder exhibited poor particle size distribution and poor dispersibility. In Comparative Example 2, the titanium oxide powder had a high ratio of rutile to anatase due to a very high preheating temperature of titanium tetrachloride, oxygen gas, hydrogen gas, and steam. In Comparative Example 3, due to a low preheating temperature and small supply amounts of oxygen gas, hydrogen gas, and steam, the oxidation reaction of titanium tetrachloride did not sufficiently proceed and anatase-type titanium oxide powder could not be obtained.

(Evaluation of Dispersibility by Dynamic Light Scattering Method)

Dispersibility of the titanium oxide powders of Example 1 and Comparative Example 2 was evaluated by the dynamic light scattering method. In the evaluation of dispersibility by the dynamic light scattering method, the colloidal particle diameter of titanium oxide powder in water versus distribution time was measured using "N5" (manufactured by Beckmann Coulter Co., Ltd.). The titanium oxide powder concentration was 10 wt %. The results are shown in FIG. 1. As can be seen in FIG. 1, the titanium oxide powder of the present invention exhibits excellent dispersibility, that is, the titanium oxide particles were efficiently dispersed in a short time.

(Evaluation as Barium Titanate Powder)

Barium titanate powders were prepared using the titanium oxide powders of Examples 2 and 3 and Comparative Example 2 to measure the specific surface areas and average particle diameters. 10 g of titanium oxide powders of Examples 2 and 3 and Comparative Example 2 and 10 g of barium carbonate powder with a specific surface area of 10 $m^2/g$ were mixed and ground for 24 hours by ball milling with zirconia balls with a diameter of 1.5 mm. Specific surface areas of mixed particles after ball milling are shown in Table 2. The ground fine particles were sintered at 900° C. for two hours to obtain barium titanate powders. The average particle diameters of the resulting barium titanate powders are shown in Table 2.

TABLE 2

|  | Titanium oxide powder of Example 2 | Titanium oxide powder of Example 3 | Titanium oxide powder of Comparative Example 2 |
|---|---|---|---|
| Specific surface area ($m^2/g$) | 22.0 | 21.1 | 18.0 |
| Average particle diameter (nm) | 100 | 101 | 200 |

It can be seen from Table 2 that when titanium oxide powder of the present invention with excellent dispersibility is used, mixed powders with a large specific surface area can be obtained by mixing and grinding by ball milling. In addition, it can be seen that the barium titanate powder obtained by sintering the mixed powder has a small average particle diameter and is an optimal material particularly for miniaturization of laminated ceramic capacitors.

INDUSTRIAL APPLICABILITY

The anatase-type titanium oxide powder of the present invention is useful as a photocatalyst. In addition, since the titanium oxide powder excels in dispersibility, barium titanate powder obtained therefrom has a small average particle diameter and can be applied particularly to miniaturization of multilayer ceramic capacitors.

The invention claimed is:

1. A method for producing an anatase-type titanium oxide powder comprising preheating titanium tetrachloride, oxygen gas, hydrogen gas, and steam at 450 to 6000° C. and reacting the preheated titanium tetrachloride, oxygen gas, hydrogen gas, and steam in a gaseous phase, wherein the amounts of oxygen gas, hydrogen gas, and steam supplied are respectively 60 to 90 l, 60 to 90 l, and 240 to 400 l per 1 l of titanium tetrachloride gas.

2. The method according to claim 1, wherein the preheating temperature is from 500 to 600° C.

3. The method according to claim 1, wherein the amounts of oxygen gas and hydrogen gas are 70 to 90 l per 1 l of titanium tetrachloride gas.

4. The method according to claim 1, wherein the amounts of oxygen gas and hydrogen gas are 80 to 90 l per 1 l of titanium tetrachloride gas.

5. The method according to claim 1, wherein the anatase-type titanium oxide powder obtained has a BET specific surface area of 20 to 80 $m^2/g$.

6. The method according to claim 1, wherein the anatase-type titanium oxide powder obtained has a BET specific surface area of 20 to 60 $m^2/g$.

7. The method according to claim 1, wherein the anatase-type titanium oxide powder obtained has a BET specific surface area of 20 to 40 $m^2/g$.

8. The method according to claim 1, wherein the anatase-type titanium oxide powder obtained has a ratio of rutile to anatase of 10% or less.

9. The method according to claim 1, wherein the anatase-type titanium oxide powder obtained has a ratio of rutile to anatase of 8% or less.

10. The method according to claim 1, wherein the anatase-type titanium oxide powder obtained has a ratio of rutile to anatase of 5% or less.

* * * * *